United States Patent
Schmitt et al.

(10) Patent No.: US 7,676,307 B2
(45) Date of Patent: *Mar. 9, 2010

(54) SYSTEM AND METHOD FOR CONTROLLING A SAFETY SYSTEM OF A VEHICLE IN RESPONSE TO CONDITIONS SENSED BY TIRE SENSORS RELATED APPLICATIONS

(75) Inventors: Paul Schmitt, Ypsilanti, MI (US); Keith Mattson, Livonia, MI (US); Erik Chubb, Hazel Park, MI (US); Michael Brewer, Royal Oak, MI (US); Albert Salib, Superior Township, MI (US); Todd Brown, Dearborn, MI (US); Todd Mory, Ypsilanti, MI (US); Daniel Eisele, Ann Arbor, MI (US); Michael Lopez, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 1511 days.

This patent is subject to a terminal disclaimer.

(21) Appl. No.: 10/937,036

(22) Filed: Sep. 9, 2004

(65) Prior Publication Data

US 2005/0033486 A1 Feb. 10, 2005

Related U.S. Application Data

(63) Continuation-in-part of application No. 10/378,225, filed on Mar. 3, 2003, now Pat. No. 6,834,218, which is a continuation of application No. 09/682,974, filed on Nov. 5, 2001, now Pat. No. 6,529,803.

(51) Int. Cl.
G05D 1/00 (2006.01)
(52) U.S. Cl. .............................. 701/38; 701/41; 701/72

(58) Field of Classification Search .................... 701/1, 701/72, 78, 83, 38, 41; 180/197, 271, 282, 180/276, 283; 303/146, 166, 189; 340/429, 340/440
See application file for complete search history.

(56) References Cited

U.S. PATENT DOCUMENTS

RE30,550 E * 3/1981 Reise .................... 188/112 A
4,480,714 A * 11/1984 Yabuta et al. ............... 180/290

(Continued)

OTHER PUBLICATIONS

U.S. Appl. No. 60/400,376, filed Aug. 1, 2002, Lu.

(Continued)

*Primary Examiner*—Richard M. Camby
(74) *Attorney, Agent, or Firm*—Angela M. Brunetti; Frederick Owens

(57) ABSTRACT

A control system for a vehicle (10) is described for use in conjunction with the safety system (44) of the vehicle (10). A tire sensor or plurality of tire sensors generates tire force signals. The tire force signals may include lateral tire forces, longitudinal (or torque) tire forces, and normal tire forces. Based upon the tire force signals, a safety system (44) may be activated. The tire force sensors may be used to monitor various conditions including but not limited to sensing a roll condition, wheel lift detection, a trip event, oversteering and understeering conditions, pitch angle, bank angle, roll angle, and the position of the center of gravity of the vehicle.

25 Claims, 12 Drawing Sheets

U.S. PATENT DOCUMENTS

| | | |
|---|---|---|
| 5,092,166 A | 3/1992 | Wada et al. |
| 5,218,861 A | 6/1993 | Brown et al. |
| 5,247,831 A | 9/1993 | Fioravanti |
| 5,341,687 A | 8/1994 | Stan |
| 5,483,827 A | 1/1996 | Kulka et al. |
| 5,731,754 A | 3/1998 | Lee, Jr. et al. |
| 5,749,984 A | 5/1998 | Frey et al. |
| 5,864,056 A | 1/1999 | Bell et al. |
| 5,960,844 A | 10/1999 | Hamaya |
| 5,964,265 A | 10/1999 | Becherer |
| 5,977,870 A | 11/1999 | Rensel et al. |
| 6,087,930 A | 7/2000 | Kulka et al. |
| 6,330,496 B1 | 12/2001 | Latarnik et al. |
| 6,474,380 B1 | 11/2002 | Rensel et al. |
| 6,539,295 B1 | 3/2003 | Katzen et al. |
| 6,637,276 B2 | 10/2003 | Adderton et al. |
| 2002/0157746 A1 | 10/2002 | Merino-Lopez et al. |
| 2004/0004486 A1 | 1/2004 | Poulbot et al. |

OTHER PUBLICATIONS

U.S. Appl. No. 60/400,172, filed Aug. 1, 2002, Lu.
U.S. Appl. No. 10/459,697, filed Jun. 11, 2003, Lu.

* cited by examiner

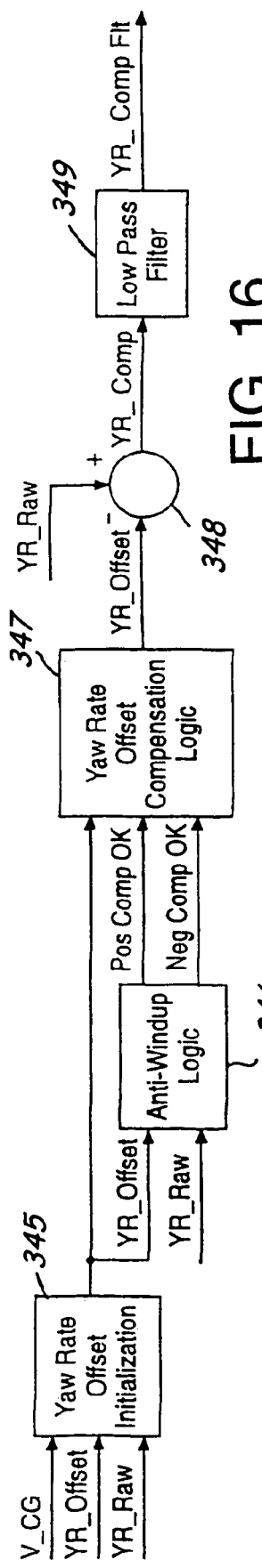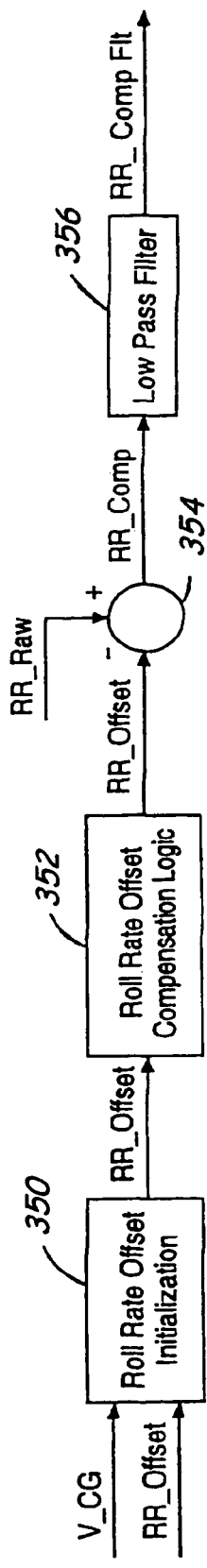
FIG. 16
FIG. 17.
FIG. 18

SYSTEM AND METHOD FOR CONTROLLING A SAFETY SYSTEM OF A VEHICLE IN RESPONSE TO CONDITIONS SENSED BY TIRE SENSORS RELATED APPLICATIONS

RELATED APPLICATIONS

The present application is a continuation-in-part of U.S. patent application Ser. No. 10/378,225 filed Mar. 3, 2003 now U.S. Pat. No. 6,834,218, which is a continuation of Ser. No. 09/682,974 U.S. Pat. No. 6,529,803, which was filed on Nov. 5, 2001.

TECHNICAL FIELD

The present invention relates generally to a control apparatus for controlling a system of an automotive vehicle in response to sensed dynamic behavior, and more specifically, to a method and apparatus for determining a dynamic behavior from tire sensors.

BACKGROUND

Dynamic control systems are currently offered in various vehicles. Dynamic control systems include roll stability control systems and yaw stability control systems. Other types of safety systems are also offered in vehicles such as deployment devices including active roll bars and side impact airbags. In such systems, various control angles are determined which, in turn, are converted to control signals for deployment or control.

The various types of safety systems include various sensors that are used to provide feedback to the system corresponding to the dynamic conditions of the vehicle. The sensors add cost to the vehicle. Typically, auto manufacturers try to reduce costs of the vehicle.

Various tire manufacturers have proposed tire sensors such as tread sensors that generate signals corresponding to forces on the tread patch. Such sensors will increase the cost of the vehicle. Such sensors, however, may provide similar information to sensors previously implemented in dynamic control systems.

Therefore, it would be desirable to reduce the cost of the vehicle by reducing the number of sensors by using the tread sensors to provide various vehicle dynamic condition information. In some vehicles it may also be desirable to provide the additional sensors to make the dynamic condition calculations more robust. That is, both the dynamic control system sensors and the tread sensors may be used to determine the dynamic condition of the vehicle.

SUMMARY OF THE INVENTION

It is therefore one object of the invention to provide a detection scheme that may be used in conjunction with the dynamic stability control system or safety system of the vehicle to determine the presence of various dynamic conditions that may include rollover.

In one aspect of the invention, a control system for a vehicle comprises a tire sensor generating a roll condition signal indicative of a roll condition, a rollover control system, and a controller coupled to the tire sensor and the rollover control system. The controller generates a control signal in response to the roll condition signal, said control signal controlling the rollover control system to prevent the vehicle from rolling over.

In one aspect of the invention, a method for controlling the vehicle comprises generating lateral tire force signals at each of the wheels using respective tire sensors, determining a roll event in response to the lateral acceleration force and reducing lateral force on an outside tire relative to a turn in response to the roll event.

In yet another aspect of the invention, a method of controlling the vehicle having front tires and rear tires comprises generating lateral force signals at each of the tires using respective tire sensors, determining an oversteer condition or understeer condition in response to the lateral tire force signals. During an oversteer condition, the lateral forces are reduced on the rear tires and during an understeer condition the lateral forces on the front tires are reduced. The changes in the forces may be performed in various ways including applying the brakes or changing the steering.

In yet another embodiment of the invention, a method of controlling a vehicle comprises generating lateral tire force signals at each of the tires using respective tire sensors, determining a trip event in response to the lateral acceleration force signals, and activating a safety system in response to the trip event.

In yet another embodiment of the invention, a method of controlling a vehicle comprises generating lateral and longitudinal (or torque) (for pitch angle estimation) force signals for each of the tires using respective tire sensors, determining a bank angle or a pitch angle in response to the tire force signals, and activating the safety system in response to the bank angle or pitch angle.

In yet another embodiment of the invention, a method of controlling a vehicle comprises calculating roll angle using respective tire sensors, and activating the safety system in response to the roll angle.

One advantage of the invention is that in certain aspects of the invention the cost of implementing a dynamic control system may be reduced.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 16 is a flow chart of a yaw rate determination according to the present invention.

FIG. 17 is a flow chart of roll rate determination according to the present invention.

FIG. 18 is a flow chart of a lateral acceleration determination according to the present invention.

DETAILED DESCRIPTION

Figure 1:
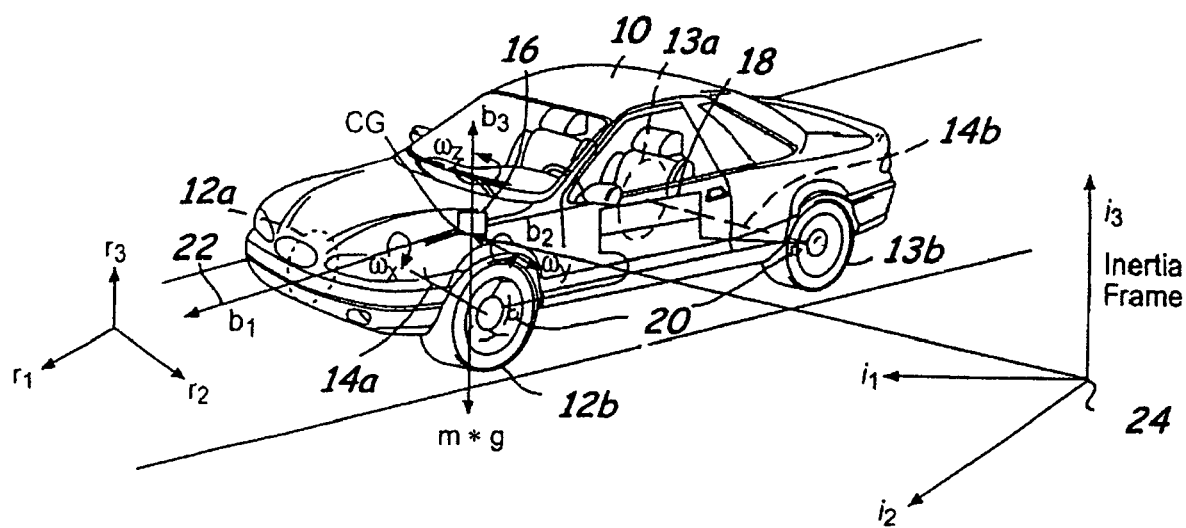
FIG. 1 is a diagrammatic view of a vehicle with variable vectors and coordinate frames according to the present invention.

In the following figures, the same reference numerals will be used to identify the same components. The present invention may be used in conjunction with a rollover control system, yaw control system or other dynamic control system. However, the present invention may also be used with a deployment device such as an airbag or an active anti-roll bar. The present invention will be discussed below in terms of preferred embodiments relating to an automotive vehicle moving in a three-dimensional road terrain.

Referring to FIG. 1, an automotive vehicle 10 with a safety system of the present invention is illustrated with the various forces and moments thereon during a dynamic condition. Vehicle 10 has front right (FR) and front left (FL) wheel/tires 12a and 12b and rear right (RR) wheel/tires 13a and rear left (RL) tires 13b respectively. The vehicle 10 may also have a number of different types of front steering systems 14a, and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

A sensing system 16 is coupled to a control system 18. In addition to the sensors, the sensing system 16 may comprise many different sensors including the sensor set typically found in a dynamic control system (including lateral accelerometer, yaw rate sensor, steering angle sensor and wheel speed sensor) together with a roll rate sensor, a vertical accelerometer, and a longitudinal accelerometer. The various sensors will be further described below. Wheel speed sensors 20 are mounted at each corner of the vehicle, and generate signals corresponding to the rotational speed of each wheel. The rest of the sensors of sensing system 16 may be mounted directly on the center of gravity of the vehicle body, along the directions x,y and z shown in FIG. 1. The lateral, vertical, and longitudinal acceleration and the roll, yaw and pitch rate may also be housed in an inertial measurement unit (IMU). As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The present invention calculations may take place in an inertial frame 24 that may be derived from the body frame 22 as described below.

The angular rate sensors and the accelerometers may be mounted on the vehicle car body along the body frame directions $b_1$, $b_2$ and $b_3$, which are the x-y-z axes of the sprung mass of the vehicle.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles (i.e., relative roll, relative pitch and relative yaw angles, respectively).

Each tire 12a, 12b, 13a, 13b may include a tire sensor 25 coupled to control system 18. The tire sensors 25 may be positioned in the tread and/or positioned in a sidewall. Thus, the tire sensors 25 may be referred to as tread or sidewall sensors. The tires sensors 25 generate signals corresponding to the forces on the tires. Other additional information may also be provided by the sensors including the tire pressure. The signals generated by the tire sensors may include a normal force signal, a lateral force signal, a longitudinal force signal, and/or a rotational wheel speed signal. Although only one sensor per tire is illustrated in FIG. 1, many sensors may be incorporated into a single tire as is described below. It should be noted that the signal generated from the sensors may correspond directly to a force, or may be processed in a controller to provide the force.

Figure 2:
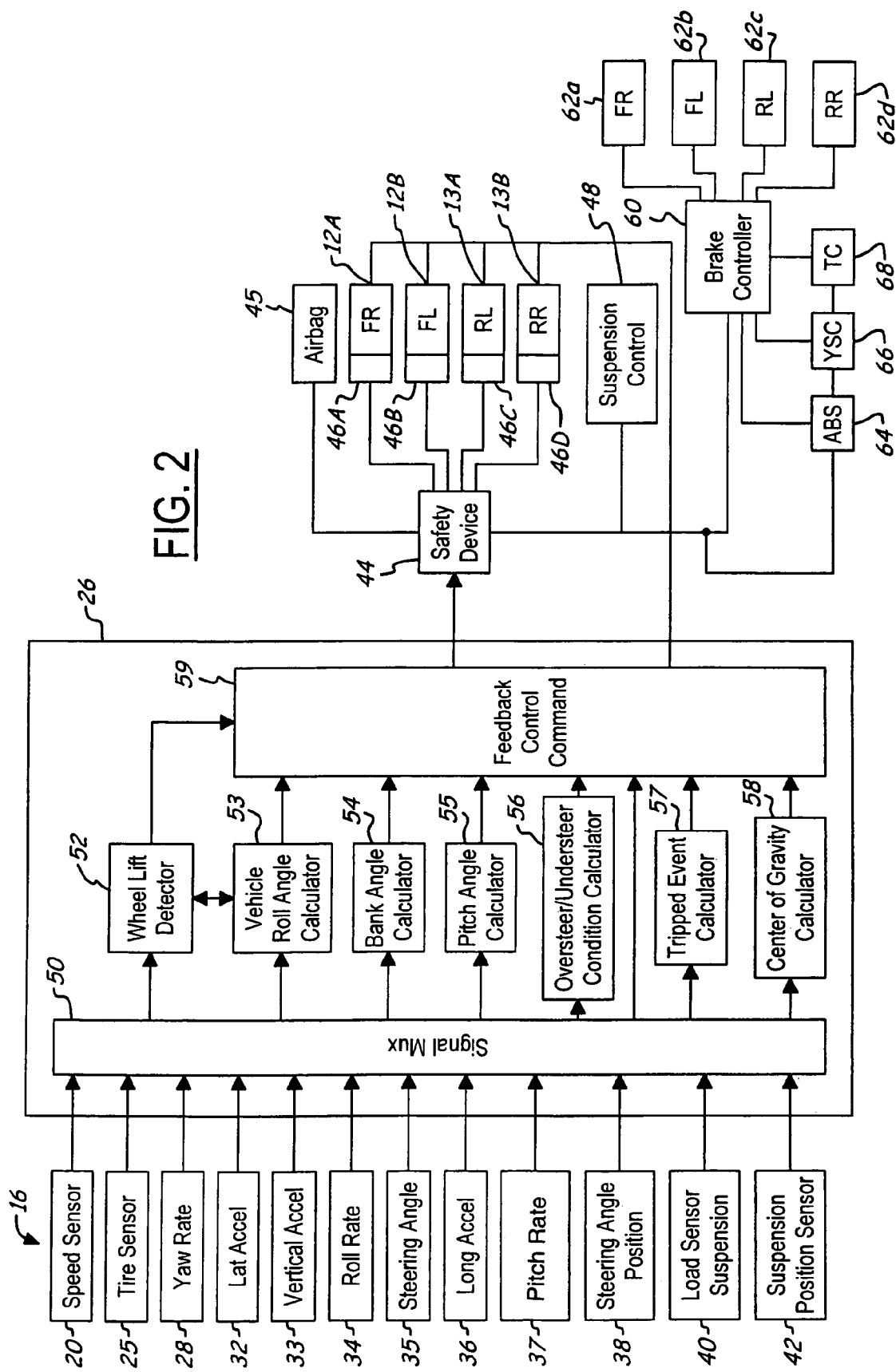
FIG. 2 is a block diagram of a stability system according to the present invention.

Referring now to FIG. 2, roll stability control system 18 is illustrated in further detail having a controller 26 used for receiving information from a number of sensors, which may include a speed sensor 20, a yaw rate sensor 28, tire sensors 25, a lateral acceleration sensor 32, a vertical acceleration sensor 33, a roll angular rate sensor 34, a steering wheel (hand wheel) angle sensor 35, a longitudinal acceleration sensor 36, a pitch rate sensor 37, steering angle position sensor 38 (of the wheels or actuator due to driver input at the road surface), suspension load sensor 40, and suspension position sensor 42. Some of these sensors may be grouped together in an IMU such as lateral acceleration, vertical acceleration, longitudinal acceleration, yaw, pitch and roll rates.

Controller 26 may include a signal multiplexer 50 that is used to receive the signals from the sensors 28-42. The signal multiplexer 50 provides the signals to a wheel lift detector 52, a vehicle roll angle calculator 53, a bank angle calculator 54, a pitch calculator 55, an oversteer/understeer condition calculator 56 and a tripped event calculator 57, a center of gravity calculator 58 and a feedback control command 59. Also, wheel lift detector 52 may be coupled to the vehicle roll angle calculator 53. The vehicle roll angle calculator 53 may also be coupled to the feedback control command 59. Vehicle roll angle calculator 53 is described in provisional applications Nos. 60/400,376 and 60/400,172, and U.S. application Ser. No. 10/459,697, the disclosures of which are incorporated herein by reference.

In one embodiment some of the sensors are located at the center of gravity of the vehicle. Sensors such as the roll rate sensor 34, yaw rate sensor 28, pitch rate sensor 37, lateral acceleration 32, vertical acceleration 33 and longitudinal acceleration may be positioned at the center of gravity. Those skilled in the art will recognize that the sensors may also be located off the center of gravity and translated equivalently thereto.

Lateral acceleration, roll orientation and speed may be obtained using a global positioning system (GPS). Such conditions may also be detected by tire sensors as described below. Tire sensors 25 may replace existing sensors, or be used in addition to existing sensors in various safety devices. Depending on the desired sensitivity of the system and various other factors, not all the sensors 28-42 may be used in a commercial embodiment.

Based upon inputs from the sensors, controller 26 may control a safety device 44. Safety device 44 may control an airbag 45 or a steering actuator 46A-46D at one or more of the wheels 12a, 12b, 13a, 13b of the vehicle 10. Also, other vehicle components such as a suspension controller 48 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 42. The position sensor 42, roll rate sensor 34, and/or the pitch rate sensor 37 may include a linear height or travel sensor, a rotary height or travel sensor, a wheel speed sensor used to look for a change in velocity, a steering wheel position sensor, a steering wheel velocity sensor, and a driver heading command input from an electronic component that may include steer-by-wire using a hand wheel or joy stick.

The roll condition or lifting may also be sensed by sensing directly or estimating the force or torque associated with the loading condition of one or more suspension or chassis components including a pressure transducer in an act of air suspension, a shock absorber sensor such as the load sensor 40, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift. These are passive methods as well.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Safety device 44 may control the position of a front right wheel actuator 46A, a front left wheel actuator 46B, a rear left wheel actuator 46C, and a right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position of the wheels.

Safety device 44 may be coupled to a brake controller 60. Brake controller 60 controls the amount of brake torque at a front right brake 62a, front left brake 62b, rear left brake 62c and a rear right brake 62d. Other safety systems such as an antilock brake system 64, a yaw stability control system 66, a traction control system 68, may also benefit from the knowledge of the information provided by the tire sensors. By knowledge of this information, the control strategy, such as an amount of braking, may be modified.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module by using the roll rate and lateral acceleration sensor signals. If both the relative roll angle and the wheel departure angles are large enough, the vehicle may be in either single wheel lifting or double wheel lifting. On the other hand, if the magnitude of both angles is small enough, the wheels are likely all grounded.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. A small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up.

The roll condition of the vehicle can be characterized by the normal loading sustained at each wheel. Theoretically, when a normal loading at a wheel decreases to zero, the wheel is no longer contacting the road surface. In this case, a potential rollover is under way. A large magnitude of this loading indicates that the wheel is grounded. As will be described below, direct measurement of normal loads on a wheel may be obtained through the use of tire sensors.

The roll condition can be identified by checking the actual road torques applied to the wheels and the road torques which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel. A lifted wheel can only sustain zero or small amounts of torque (due to frictional losses), and may be identified as such.

The roll condition of a vehicle can be characterized by the relative roll angle $\theta_{xr}$ the vehicle body and the wheel axle, which has been calculated by using the roll rate and lateral acceleration sensor signals. If this roll angle is increasing rapidly, the vehicle might be in the edge of wheel lifting or rollover. Small magnitude of this angle indicates the wheels are not lifted or are all grounded.

The roll condition of a vehicle can also be characterized by the roll angle between the wheel axle and the average road surface, this is called wheel departure angle. If this roll angle is increasing rapidly, the vehicle has lifted wheel or wheels and aggressive control action needs to be taken in order to prevent the vehicle from rolling over. Small magnitude of this angle indicates the wheels are not lifted. The vehicle roll angle calculator 53 quantitatively determines the vehicle roll angle when a qualitative wheel lifting is identified in the wheel lift detector 52. That is, if a qualitative wheel lifting is detected, a quantitative computation of the wheel lifting may be initiated.

Bank angle calculator 54 generates a bank angle signal corresponding to the bank angle on to which the road is traveling. Pitch angle calculator 55 generates a pitch angle signal corresponding to the pitch angle of the vehicle. Oversteer/understeer condition calculator 56 determines if the vehicle is oversteering or understeering. Tripped event calculator 57 determines the presence of a tripped event acting on the vehicle. Center of gravity calculator 58 may determine the x, y and z coordinates of the center of gravity of the vehicle. The feedback control command 59 controls the safety device in response to the various sensor inputs and calculator inputs.

Figure 3:
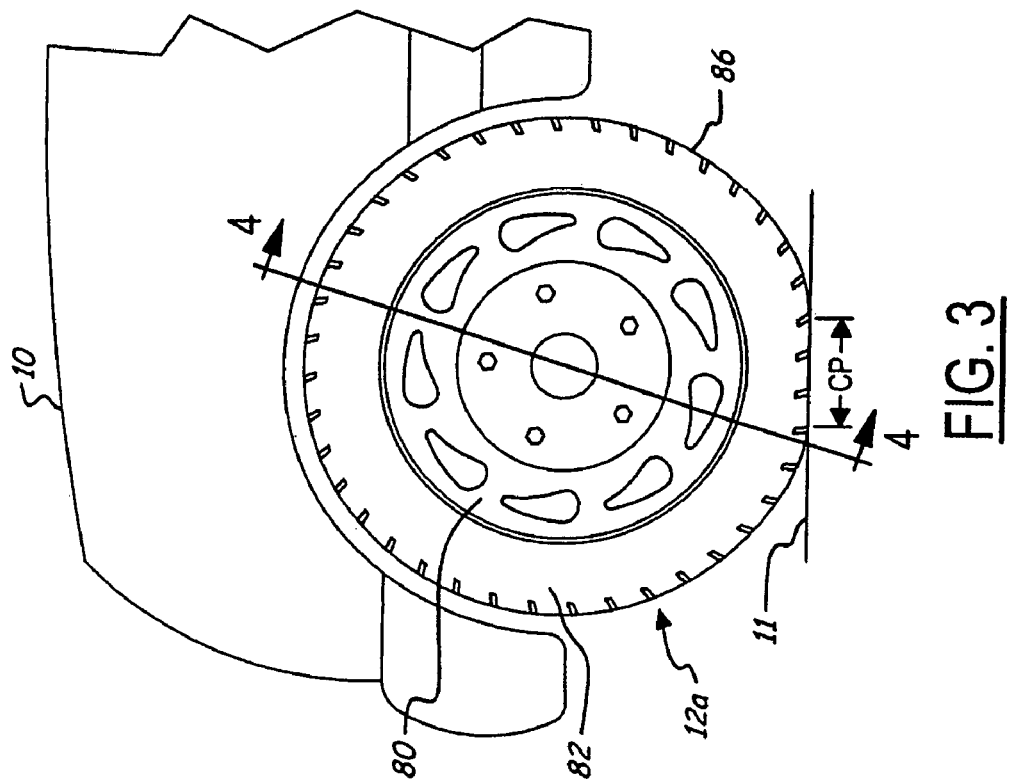
FIG. 3 is a side view of an automotive vehicle having tire sensors according to the present invention

Referring now to FIG. 3, one wheel/tire assembly 12a is illustrated having wheel 80 and tire 82. The vehicle 10 may be equipped with any number of tire and wheel assemblies, such as four tires and wheels, as is commonly employed on automotive vehicles. Tire 82 includes a tread portion 86 formed about the outer peripheral circumference thereof, for contacting the underlying road surface 11. The tire 82 is a pneumatic tire that has an inflated tire pressure preferably within a desired operating range. The outer peripheral tread portion 86 of tire 82 has a constant circumferential length, which is substantially round. However, under vehicle load, tread portion 86 has a flattened contact patch area CP at the tire to road surface interface.

Figure 4:
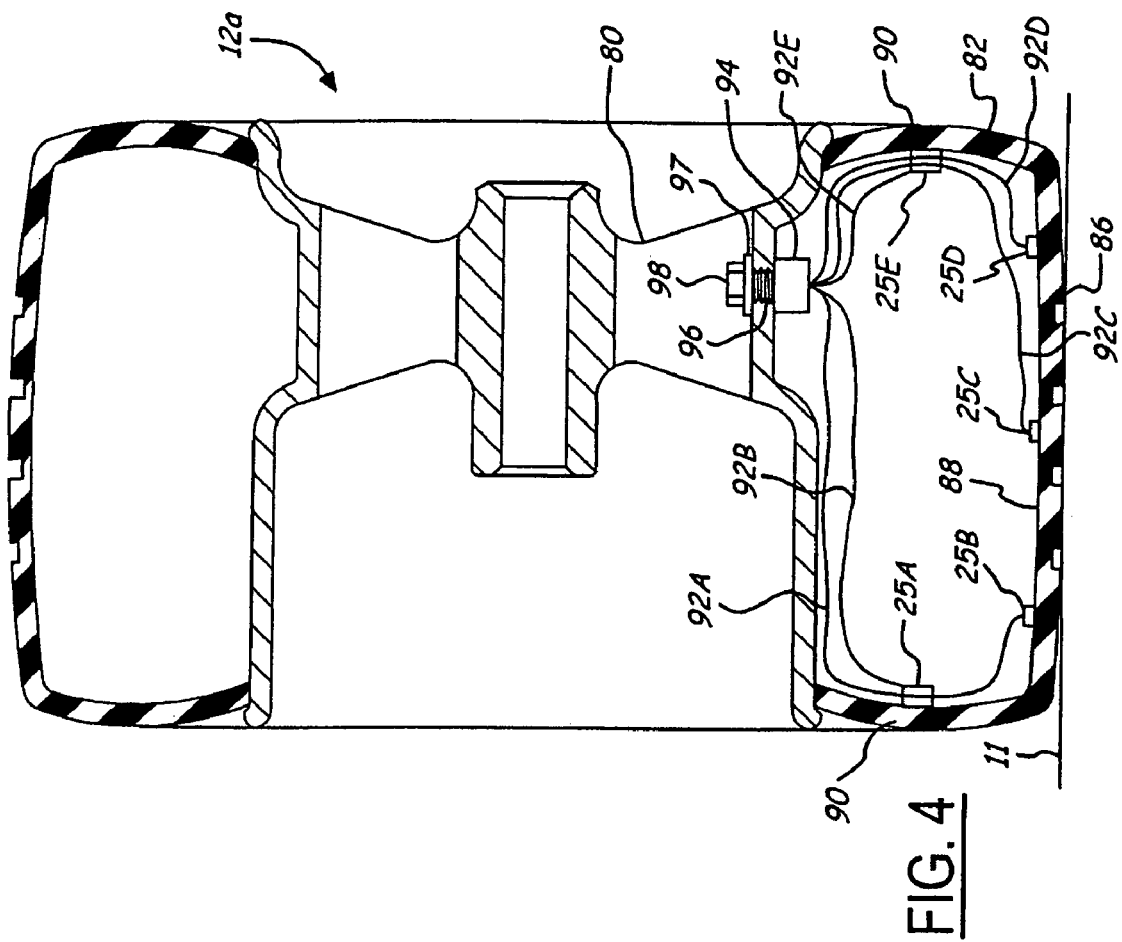
FIG. 4 is a cross-sectional view of FIG. 3 illustrating the position of tire sensors within the tire.

Referring now to FIG. 4, the tire and wheel assembly 12a is further shown having various tire sensors 25a, 25b, 25c, 25d, and 25e. Sensors 25b, 25c, and 25d are mounted to the inner wall 88 of the tread portion 86. Other sensors 25a and 25e may be mounted to the inside surface of sidewalls 90 of tires 82. Each of the sensors 25a-25e monitors the deformation of the tire 82 so that various forces acting on the tire may be derived therefrom. For example, longitudinal, lateral and normal forces may be derived therefrom. Various types of sensors are suitable for such applications such as piezo-resistive-type sensors and resistive ink flex sensors. However, various other types of sensors may be employed for detecting such forces. Other known sensors may include but are not limited to photoresistive fiber optic sensors, variable capacitor-type sensors, and variable inductor-type sensors. While five sensors are illustrated across the tire in FIG. 4, various numbers of sensors including fewer sensors or more sensors may be implemented. It should also be noted that only one portion of the cross-sectional area is illustrated. Similar sensors may be located at the positions illustrated by 25a-25e and separated along the circumference. Lead lines 92a-92e are coupled to a respective sensor 25a-25e. The lead lines 92a-92e are coupled to a controller/transmitter housing 94 for processing and transmitting to vehicle controller 26. Lead lines 92a-92e may be bonded or otherwise attached to the inner walls of tire 82. It should be noted that wireless signal transmissions may be used in place of lead lines. As illustrated, controller/transmitter 94 is rim mounted to wheel 80 via a fastening screw 96 and nut 98. A seal 97 may be disposed between nut 98 and wheel 80 to prevent air leakage from the tire/wheel assembly. Of course, other locations such as within the valve stem or sidewalls may provide suitable locations for the controller/transmitter housing 94.

The controller/transmitter housing 94 may communicate using digital messages to a remotely located rf frequency receiver coupled to controller 26. Controller/transmitter housing 94 may also incorporate a microprocessor and memory suitable for controlling the transmission of the various sensor signals and identification signals corresponding to the tire position of the vehicle. Suitable sensors/microprocessor configurations are described in U.S. Pat. No. 6,539,295, the disclosure of which is incorporated by reference herein.

Referring now to FIGS. 5-10, various positions or locations of the vehicle illustrate such things as the center of gravity c.g., the distance from the front of the car x the height of the center of gravity z and the lateral distance y of the center of gravity are also illustrated. Various normal forces N1, N2, N3 that may be sensed by the tire sensors are illustrated. Also, lateral forces L1 and L3 that may be sensed by the tire sensors are also illustrated. The vehicle 10 is illustrated on road surface 11. Although not all of the forces are illustrated, each of the tires and thus the tire sensors may be subjected to the various forces.

Figure 5:
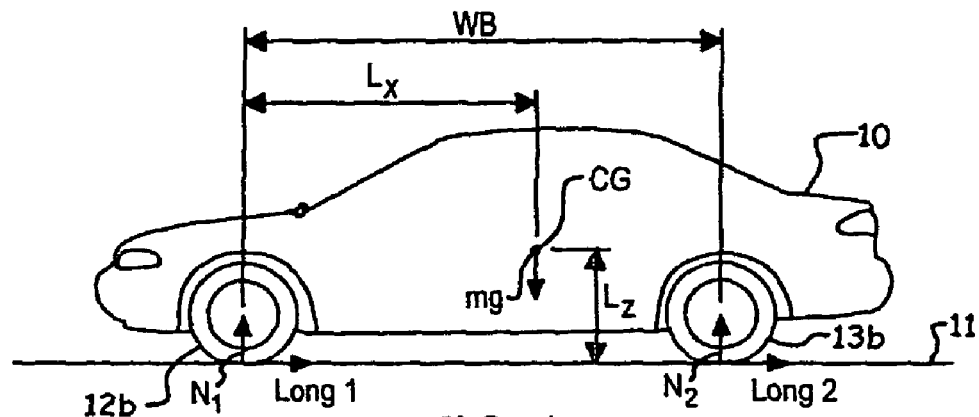
FIG. 5 is a side view of an automotive vehicle illustrating various forces.

Referring now to FIG. 5, a side view of vehicle 10 is illustrated having normal forces N1, N2 and longitudinal forces Long1 and Long2. The center of gravity c.g. is illustrated. The distance from the front wheel center is set forth as Lx and the distance from the road surface is set forth as Lz.

The vehicle is assumed to be at rest or at constant velocity.

$$Lx = \frac{WB \cdot N_2}{N_1 + N_2}$$

where=WB=length of wheel base, $N_2$=normal forces at both rear tires, $N_1$=normal forces at both front tires.

The vertical distance of the center of gravity of the vehicle may be determined by $$L_z = \frac{L_x \cdot (N_1 + N_2) - WB \cdot N_2}{Long_2}$$

$$Long_2 = ma_x$$

In practice, $Long_2$ values around zero should be excluded for best accuracy or $$|Long_2| > e$$

where e is chosen such that small variations around $Long_2$ yield small variations of $L_z$.

It should be noted that $N_2$ can come from engine estimate, vehicle speed differentiated, or from wheel speed sensors differentiated or $Long_2$ can come from f (engine torque, rolling radius).

Figure 6:
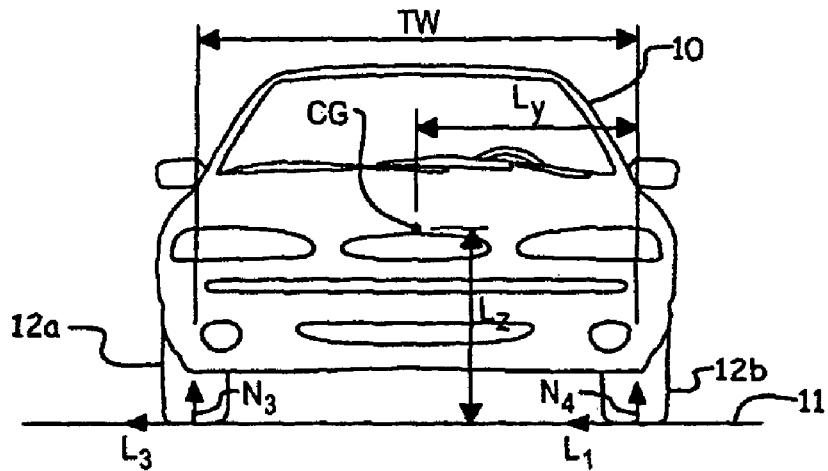
FIG. 6 is a front view of an automotive vehicle illustrating various forces and positions of the center of gravity.

In FIG. 6 a front view of the vehicle 10 is illustrated with the lateral distance Ly to the center of gravity and the vertical distance Lz to the center of gravity. Lateral forces L1 and L3 are illustrated as well as normal forces N3 and N4. The vehicle is assumed to be at rest or at constant velocity.

$$L_y = \frac{TW \cdot N_3}{N_4 + N_3}$$

where TW is the track width, $N_4$ is the normal forces on left side tires, $N_3$ is the normal forces on both right side tires.

Figure 7:
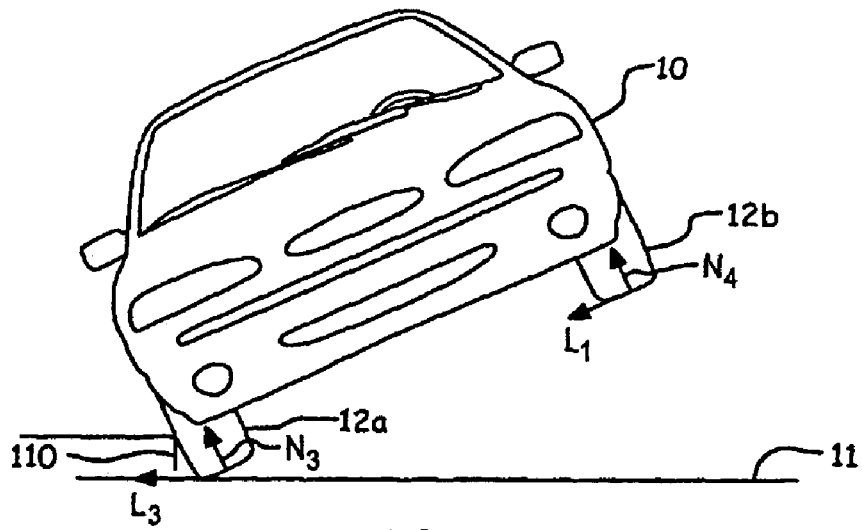
FIG. 7 is a front view of a vehicle in a tripped event.

In FIG. 7, a front view of a vehicle having lift is illustrated. In this embodiment, normal force N4 and lateral force L1 would be near or at zero since wheel/tire assembly 12b is lifted from the road surface 11. In this embodiment, a step 110 is shown tripping the vehicle. Typically, a vehicle 10 may experience such a situation when a high lateral force causes the vehicle to slide into an object such as step 110. Another situation that may cause a trip maneuver is the vehicle transferring from a low mu surface to a high mu surface. In such a case, the lateral force L3 may be increased in a step-like function when reaching step 110. By comparing the normal forces N1 and N3, the determination of wheel lift may be determined. A shift of the normal force from N4 to N3 is evident upon wheel lift.

Figure 8:
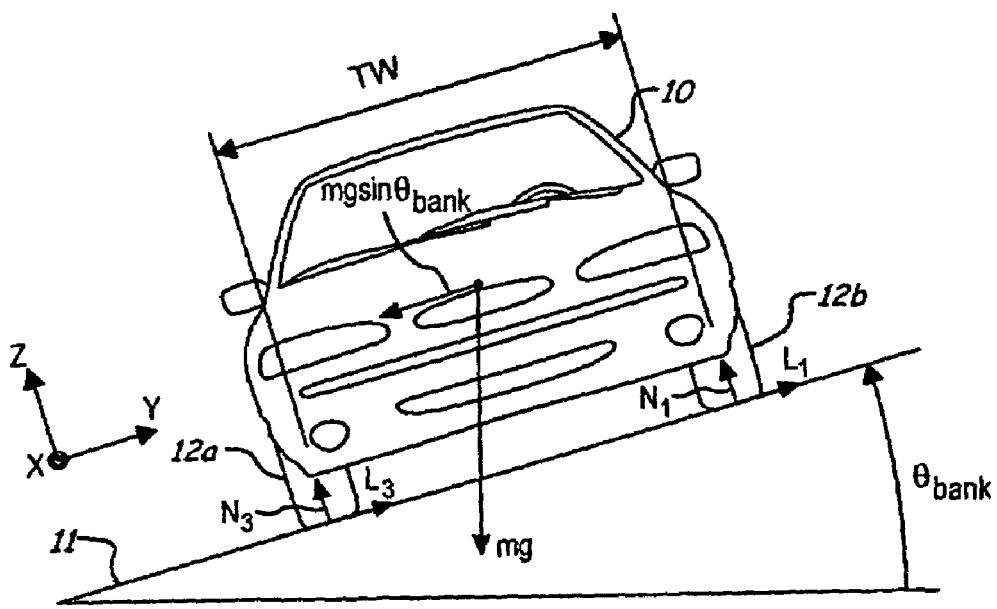
FIG. 8 is a front view of a vehicle on a road bank.

In FIG. 8, a bank angle $\theta_{bank}$ is illustrated for a vehicle in dynamic motion in the following:

m=mass of vehicle $L_1+L_3$=sum of lateral component of tire patch forces, or $\Sigma F_{tires,lat}$ Dynamic Equation of Motion $$\Sigma F_{tires,lat} = mg \sin \theta_{bank} + \text{kinematic forces}$$

$V_x$=velocity component in x direction (typically called $V_{ref}$)

$V_y$=velocity component in y direction $\omega_x$=rotational velocity about z-axis-yaw rate sensor output Kinematic Forces=[Centrifugal Force+Lateral Forces]= $mV_xW_z+m\dot{V}_y$ $\dot{V}_y$ can be expressed as $\dot{V}_y =$ Cornering compliance $\frac{d}{dt} \sum F_{tires,lat} \cdot V_x$ since $V_y =$ $$\alpha V_x \alpha = \tan \frac{V_y}{V_x} \approx \frac{V_y}{V_x} \text{ for small } \alpha$$

Figure 11:
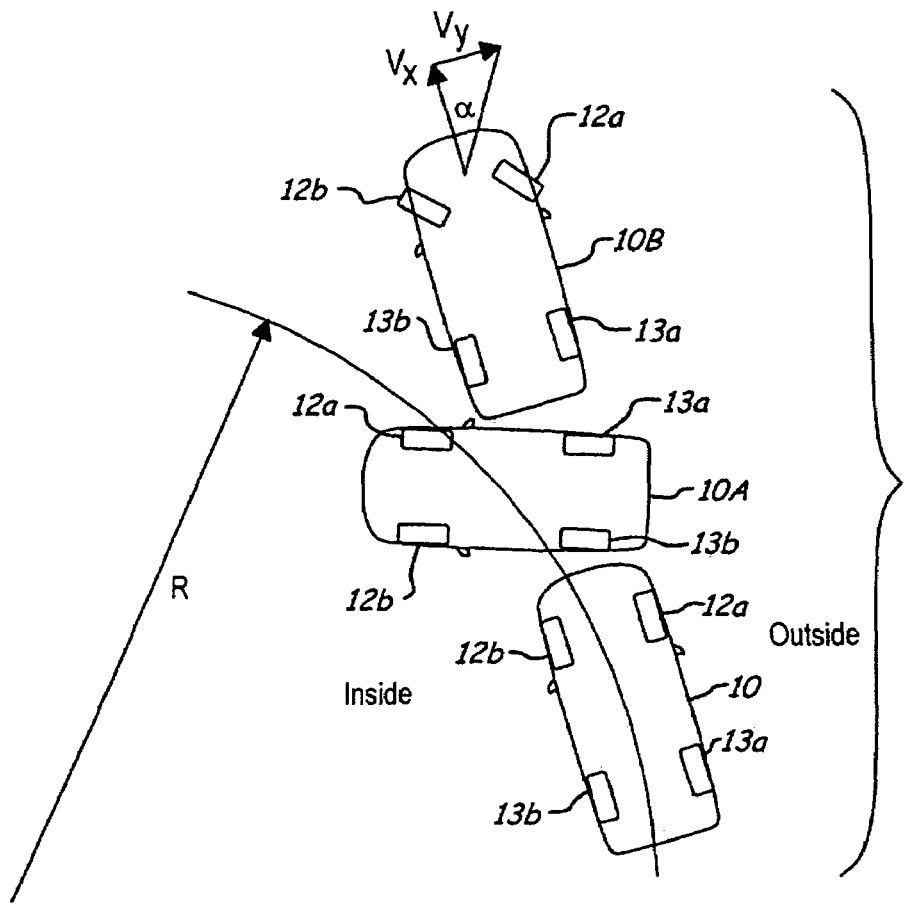
FIG. 11 is a plot of three vehicles illustrating an oversteer and understeer condition.

$\alpha$=cornering compliance-$F_y$(d,$V_x$,$V_y$ are shown in FIG. 11)

Cornering compliance=CCR $$\sum F_{tires,lat} = mg \sin \theta_{bank} + mV_x\omega_x + mCCR \cdot \frac{d}{dt}\left(\sum F_{tires,lat}\right) \cdot V_x$$

$$g \sin \theta_{bank} = \frac{\sum F_{tires,lat}}{m} - V_x\omega_x - CCR \cdot \frac{d}{dt}\left(\sum F_{tires,lat}\right) \cdot V_x$$

$$\theta_{bank} = \sin^{-1}\left[\frac{\sum F_{tires,lat}}{mg} - \frac{V_x\omega_x}{g} - \frac{CCR}{g}\frac{d}{dt}\left(\sum F_{tires,lat}\right) \cdot V_x\right]$$

Figure 9:
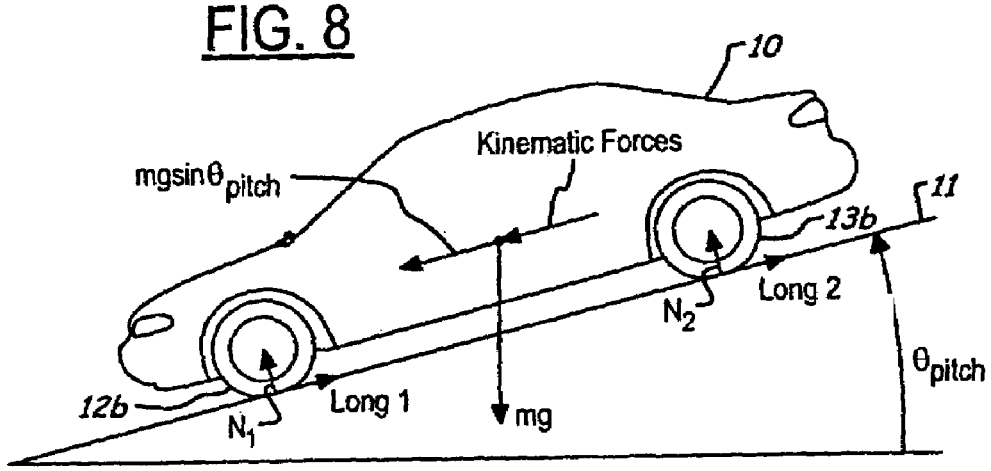
FIG. 9 is a side view of a vehicle on a pitch slope.

In FIG. 9, the pitch angle $\theta_{pitch}$ may also be determined for a dynamic vehicle. In this manner, normal force N1 may be greater than normal N2. Likewise, the forces on the opposite side of the vehicle N3 and N4 (not shown) may also be used simultaneously with normal forces N1 and N2 to determine the pitch angle of the vehicle.

One approach to determining pitch angle is set forth below.

$Long_1+Long_2$ represents the sum of longitudinal forces on all tire pitches less forces due to engine torque plus braking forces $$Long_1+Long_2=\Sigma F_{tires,long}$$

Dynamic equation of motion $$\Sigma F_{tires,long}=mg \sin \theta_{pitch}+\text{Kinematic Forces}$$

$V_x$=velocity component in x direction (typically called $V_{ref}$ in the business)

$V_y$=velocity component in y direction $\omega_z$=yaw rate (from yaw rate sensor)

Kinematic Forces=centrifugal force+lateral forces=$mV_y\omega_z-m\dot{V}_x$ $V_y$ can be expressed as $V_y=CCR \cdot (\Sigma F_{tires,lat})V_x$ $$\Sigma F_{tires,long}=mg \sin \theta_{pitch}+mV_y\omega_z-m\dot{V}_x$$

$$\Sigma F_{tires,long}=mg \sin \theta_{pitch}+mCCR(\Sigma F_{tires,lat})V_x\omega_z-m\dot{V}_x$$

$$\theta_{pitch} = \sin^{-1}\left[\frac{\sum F_{tires,long}}{mg} + \frac{CCR\sum F_{tires,lat}V_x}{g} - \frac{\dot{V}_x}{g}\right]$$

Figure 10:
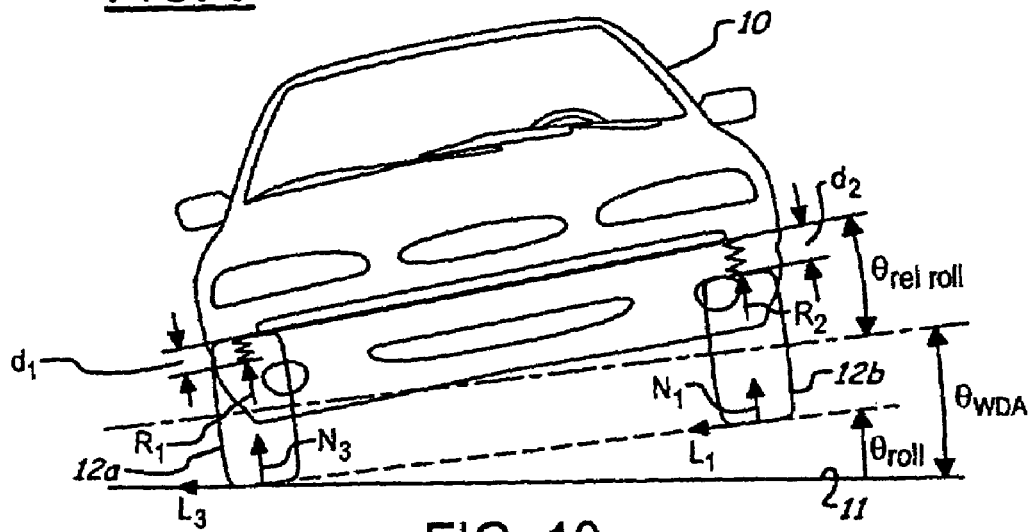
FIG. 10 is a front view of a vehicle undergoing a roll condition.

In FIG. 10, vehicle 10 is illustrated having a lifted wheel 12b above the surface 11 by a roll angle $\theta_{roll}$. There also may be a suspension roll angle between the body of the vehicle and the axle of the vehicle. This angle may be referred to as the relative $\theta_{rel\ roll}$. A wheel departure angle between the average road surface and the axle may also be determined. This angle is referred to as the wheel departure angle $\theta_{wda}$. By using the tire sensors alone or in combination with other sensors, the various angles may be determined. The relative roll angle may be determined by:

$$d_1 = \frac{R_1}{K_1} \quad K_1, K_2 \text{ are spring constants}$$

$$d_2 = \frac{R_2}{K_2} \quad TW = \text{track width}$$

$$\sin\theta_{rel} = \frac{d_2 - d_1}{TW}$$

$$\theta_{rel\ roll} = \sin^{-1}\left(\frac{\frac{R_2}{K_2} - \frac{R_1}{K_1}}{TW}\right)$$

A low pass (LP) filter may be added to remove high frequency content.

$$\theta_{rel\ roll} = LP\left(\sin^{-1}\left(\frac{\frac{R_2}{K_2} - \frac{R_1}{K_1}}{TW}\right)\right)$$

But in general $\theta_{rel\ roll} = f(\text{normal tire forces,TW,spring constant, damping constant.})$ Referring now to FIG. 11, vehicle 10 is illustrated negotiating a turn with a radius R. FIG. 11 illustrates an oversteering condition in FIG. 10A causing the vehicle to "fishtail." The vehicle 10B is in an understeering condition. In this position the wheels 12a, 12b have a steering angle but the desired direction of travel along radius R is not maintained. That is, the lateral force on the tires 12a, 12b is high.

As will be further described below, the inside tires in the figure shown in FIG. 11 has inside tires 12b and 13b while tires 12a and 13a are referred to as the outside tires. The determination of inside or outside is determined based on the turning direction of the vehicle.

Figure 12:
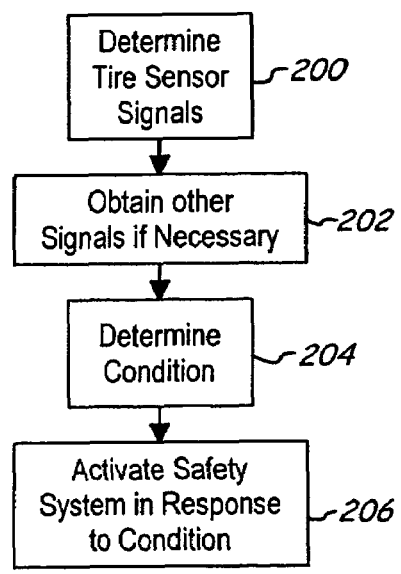
FIG. 12 is a flow chart illustrating an embodiment of the present invention.

Referring now to FIG. 12, a general flow chart of the operation of the present invention is illustrated. In step 200, the various tire sensor signals are determined. As mentioned above, the tire sensors may be rf communicated or directly communicated to a controller. In step 202 other sensors if necessary are provided to the controller. In step 204, a condition such as a roll condition, wheel lifted condition, a bank angle, pitch angle, an oversteer or understeer condition, a tripped event or a position of the center of gravity is determined. In step 206 a safety system is activated in response to the condition. For example, a rollover stability control system may be activated. Also a yaw control, a traction control system, an anti-lock braking system, a braking system, or steering system may be activated to prevent or reduce an undesired dynamic condition in the vehicle.

Specific examples of the determination of the various conditions are set forth below.

The first example of a condition is a wheel lifted condition. When a wheel is lifted, the normal force at the tread will be reduced to zero or near zero. Thus, when a tread sensor value reduces below a lift threshold, a roll stability control system may be activated. The threshold does not need to be zero since a normal load below a predetermined threshold, above a predetermined rate of change, may indicate the vehicle is tending to roll over. In one implementation, if braking is used for roll stability control, hydraulic pressure may be built up in the braking system below a first normal force threshold and the roll stability control system may apply the braking pressure below a normal force threshold smaller than the first threshold. Those skilled in the art will recognize that braking pressure takes some finite amount of time so that a sufficient amount of braking pressure may be applied to a particular wheel if desired. Such as system may also be used to augment or increase the confidence in other wheel lift determinations. In some situations, wheel lifting may be determined by various combinations of sensors indirectly. Direct methods are also used that apply brakes and look at the change in torque or acceleration of the wheel. The system described herein may be used to identify a potentially lifted condition and verify that by applying the brakes. These actions may be performed by the wheel lift detector 52.

In certain conditions it may be also desirable to filter the road noise from the sensor. Thus, by using a low pass frequency filter only the gross vehicle normal forces may be monitored. Of course, various averaging and other numerical techniques may be applied to the bank and pitch angle numbers to supply the most accurate number to the dynamic control system. The various calculations and correlations may be verified and calibrated in a test track condition for the specific vehicle type. Production vehicles may then have the calibration set according to the test calculations.

A tripped event may also be determined in step 204 of FIG. 12. A tripped event may be determined by using the lateral acceleration at each tire, the normal force at each tire, alone or in combination. For example, an abrupt change in lateral force from a high force to zero or near zero may indicate a tripped event. This, in combination with the normal force on the lifted side of the vehicle reaching zero, may indicate a lifted wheel event. Thus, the onset of tripping may be identified. Also, the lateral forces may also be used to determine the onset of a lightly tripped event versus a rapid tripped event. In a lightly tripped event, the restraint or braking technologies may be activated differently. For example, in a braking condition, early identification of a lightly tripped event can trigger system pressure build earlier, enabling earlier, and less harsh, interventions. Also, in a lightly tripped condition, a deployment device such as a side curtain airbag may be deployed in a different manner, i.e., less forceful or harsh, than in a rapid deployment condition. This allows the airbag deployment to coincide with the roll motion of the vehicle.

The center of gravity calculator 58 may be used to determine the position of the center of gravity as a condition in step 204 of FIG. 12. At rest, the x and y positions of the center of gravity may be determined. Typically, the center of gravity is approximated at the time of system development and is unaltered in day-to-day loading. Changes in the roof rack loading, for example, may change the center of gravity of the vehicle. Thus, at rest the normal forces on the tires may be used to determine the x and y coordinates from the nominal value. That is, should the vehicle have greater normal forces on the right side of the vehicle versus the left side of the vehicle, the center of gravity may be shifted by an amount due to the difference of the right and left side normal forces. Likewise, forward and rearward changes in the center of gravity may also be performed based on the normal forces of the front versus rear of the vehicle. When the vehicle starts from rest, the vehicle accelerates. Upon acceleration, the z or vertical coordinate of the center of gravity may be determined trigonometrically. These forces may also be determined by monitoring the normal forces. Upon acceleration, the amount of rotation of a load such as on the roof rack, may change the normal loading in a different way than if the vehicle is unloaded. Thus, by monitoring the changes of the normal forces under a known acceleration, the amount of loading of the vehicle may be determined.

It should also be noted that because the center of gravity is known, the roll rate as determined above may be determined about the center of gravity of the vehicle.

Once a predetermined condition is determined such as a roll event, the lateral forces on the outside tire relative to a turn may be reduced in response to the roll.

In oversteer/understeer condition calculator 56, an analysis may be performed based on the lateral forces of the tires. Feedback may be provided from the tires based on the lateral forces to the dynamic control system to prevent oversteer and understeer.

Figure 13:
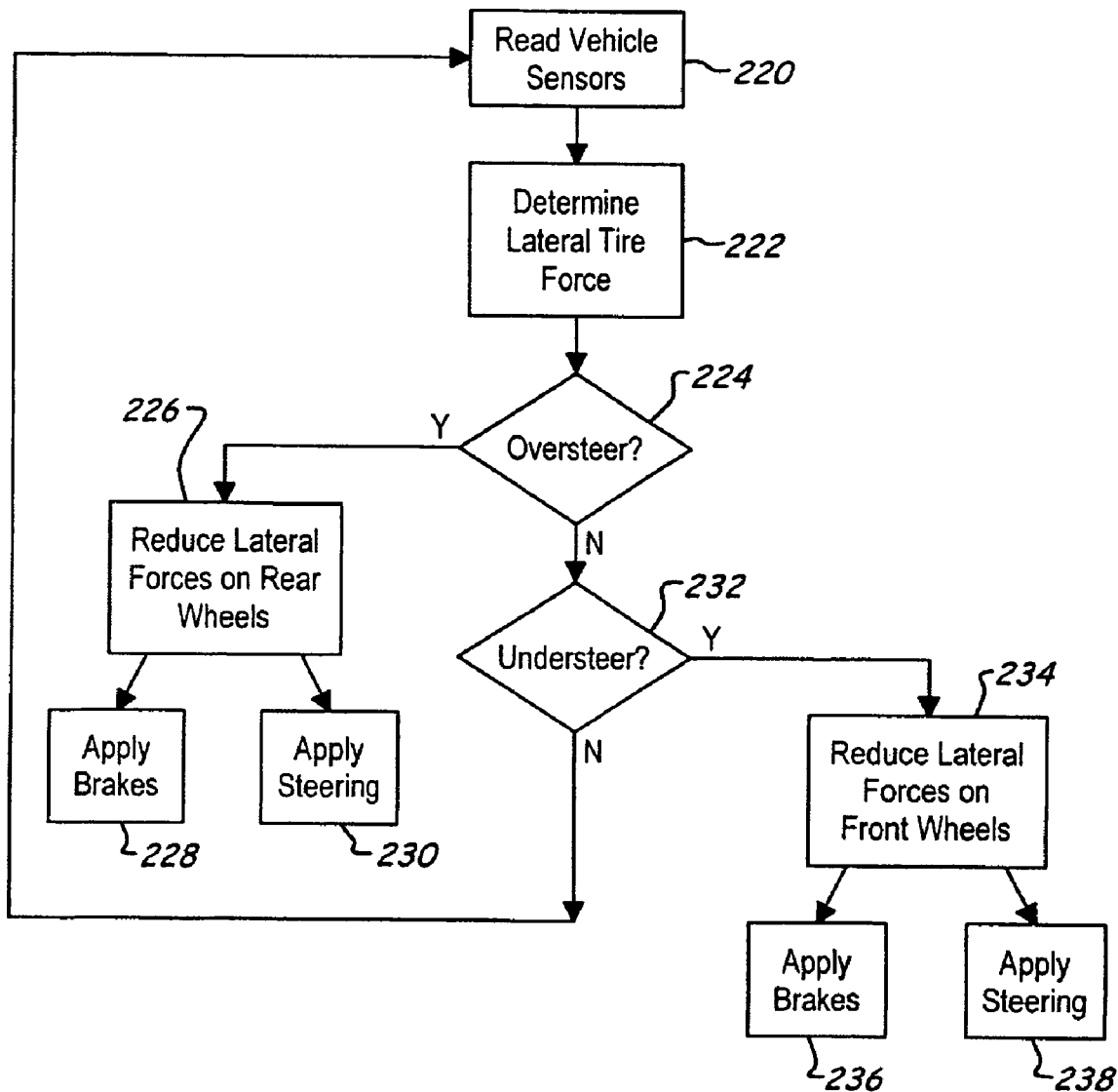
FIG. 13 is a flow chart illustrating an oversteer or understeer control operation.

In FIG. 13, the vehicle sensors are read in step 220. In step 222, the lateral tire forces from each tire is determined. In step 224 it is determined whether the vehicle is in an oversteer condition. An oversteer event is identified by saturated lateral rear tire forces. If an oversteer event has been identified in step 224, step 226 increases the lateral tire force capability on the front wheels by applying the brakes in step 228 or by steering slightly out of the turn in step 230. It should also be recognized that both applying brakes and applying steering may also be used to increase the lateral force capability on the tires.

Referring back to step 224, if an oversteer condition is not present, step 232 determines whether the vehicle is in an understeering condition. If the vehicle is not in a vehicle understeering condition, step 220 is repeated. In step 232 if the vehicle is in an understeering condition, step 234 is executed in which the lateral force capability on the front wheels are increased. In step 234, the lateral forces on the front wheels are reduced in step 236 by applying brakes or in step 238 by applying steering "out" of the turn slightly to un-saturate the lateral tire force capability. It should be noted that applying steering and brakes may be performed. It should also be noted that applying steering in steps 230 and 238 may be performed by applying a steering direction change in one or more wheels. This may be performed by independent actuators at each of the four wheels, front steering, rear steering, or a combination of both. Applying a steering direction change may most easily be implemented in a steer-by-wire system. However, other types of conventional steering systems may be adapted to apply a steering change. Also, it may be desirable to gradually apply such a steering correction to reduce the potential for an undesirable feedback to the vehicle operator.

Safety systems such as yaw control and rollover control systems may particularly benefit from such determinations. Deploying device type safety devices such as side airbags and active roll bars may also benefit.

A specific example with respect to a rollover control system is now set forth.

Figure 14:
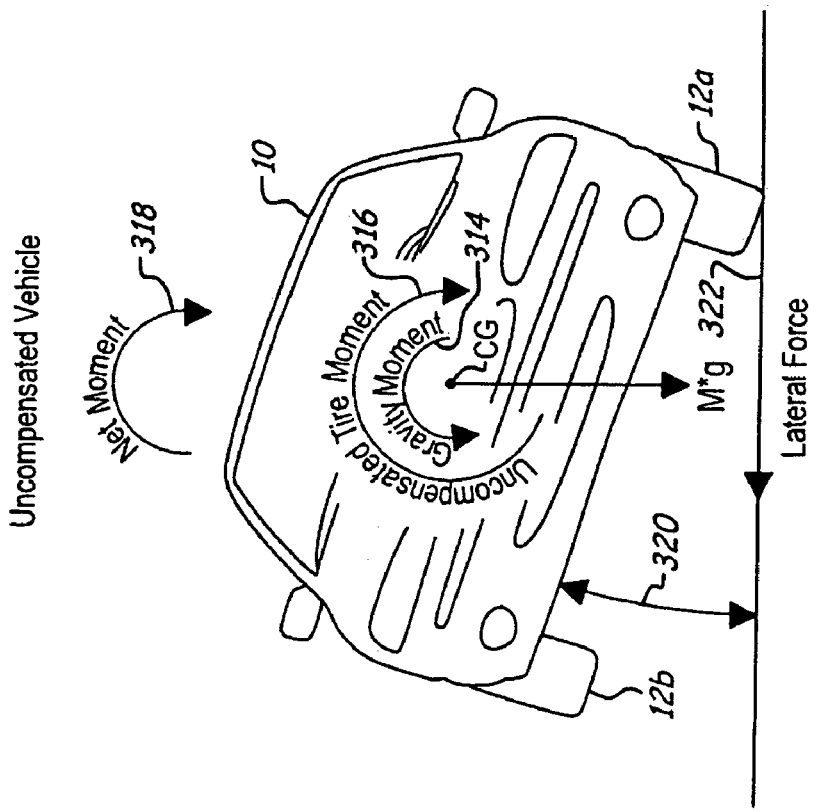
FIG. 14 is a diagrammatic front view of a vehicle with force vectors not having a roll stability system according to the present invention.

Referring to FIG. 14, an automotive vehicle 10 without a rollover stability system of the present invention is illustrated with the various forces and moments thereon during a rollover condition. Vehicle 10 has right and left tires 12a and 12b respectively. The vehicle may also have a number of different types of steering configurations including having each of the front and rear wheels configured with an independently controllable actuator, the front and rear wheels having a conventional type system in which both of the front wheels are controlled together and both of the rear wheels are controlled together, a system having conventional front steering and independently controllable rear steering for each of the wheels or vice versa. Variation of a control system for each will be described below. Generally, the vehicle has a weight represented as M*g at the center of gravity of the vehicle. A gravity moment 314 acts about the center of gravity (CG) in a counter-clockwise direction. A tire moment 316 acts in a clockwise direction about the center of gravity. Thus, the net moment 318 acting upon the vehicle is in a clockwise direction and thus increases the roll angle 320 of the vehicle. A lateral force 322 at the tire 12a on the ground (tire vector) is a significant force to the left of the diagram capable of overturning the vehicle if uncorrected.

Figure 15:
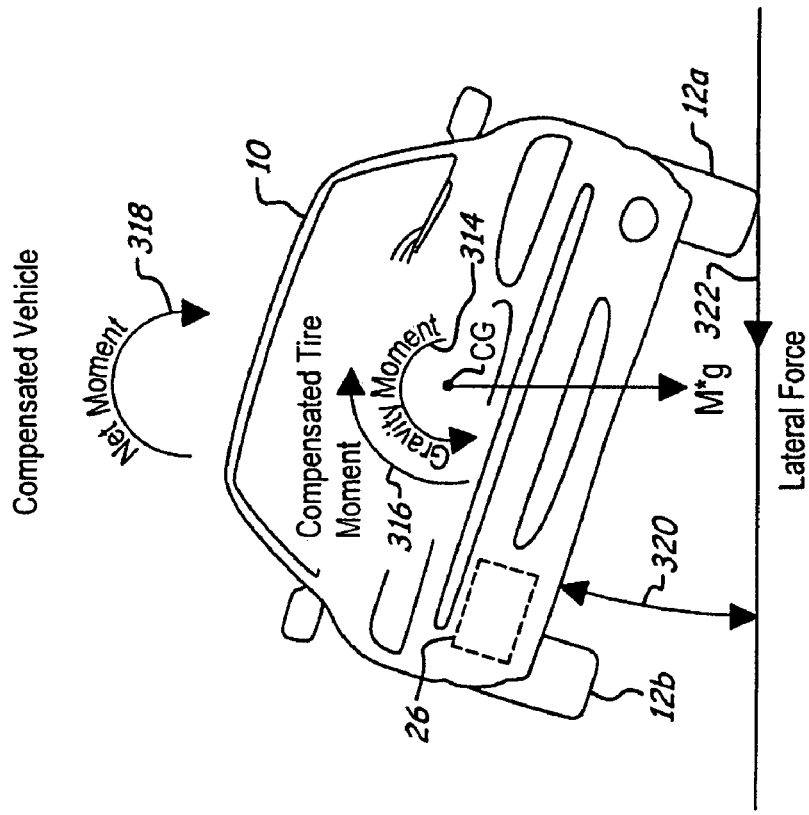
FIG. 15 is a diagrammatic front view of a vehicle with force vectors having a roll stability system according to the present invention.

Referring now to FIG. 15, a roll stability control system 24 (not shown) is included within vehicle 10, which is in a roll condition. The forces illustrated in FIG. 14 are given the same reference numerals as the forces and moments in FIG. 15. In FIG. 15, however, roll stability controller 26 reduces the tire moment 316 to provide a net moment 318 in a counter-clockwise direction. Thus, the tire vector or lateral force 322 at tire 12a is reduced as well. This tendency allows the vehicle to tend toward the horizontal and thus reduce angle 320.

Referring now to FIG. 16, the yaw rate sensor 28 generates a raw yaw rate signal (YR_Raw). A yaw rate compensated and filtered signal (YR_CompFlt) is determined. The velocity of the vehicle at center of gravity (V_CG), the yaw rate offset (YR_Offset) and the raw yaw rate signal from the yaw rate sensor (YR_Raw) are used in a yaw rate offset initialization block 345 to determine an initial yaw rate offset. Because this is an iterative process, the yaw rate offset from the previous calculation is used by yaw rate offset initialization block 345. If the vehicle is not moving as during startup, the yaw rate offset signal is that value which results in a compensated yaw rate of zero. This yaw rate offset signal helps provide an accurate reading. For example, if the vehicle is at rest, the yaw rate signal should be zero. However, if the vehicle is reading a yaw rate value then that yaw rate value is used as the yaw rate offset. The yaw rate offset signal along with the raw yaw rate signal is used in an anti-windup logic block 346. The anti-windup logic block 346 is used to cancel drift in the yaw rate signal. The yaw rate signal may have drift over time due to temperature or other environmental factors. The anti-windup logic block also helps compensate for when the vehicle is traveling constantly in a turn for a relatively long period. The anti-windup logic block 46 generates either a positive compensation OK signal (Pos Comp OK) or a negative compensation OK signal (Neg Comp OK). Positive and negative in this manner have been arbitrarily chosen to be the right and left direction with respect to the forward direction of the vehicle, respectively. The positive compensation OK signal, the negative compensation OK signal and the yaw rate offset signal are inputs to yaw rate offset compensation logic block 347.

The yaw rate offset compensation logic block 347 is used to take data over a long period of time. The data over time should have an average yaw of zero. This calculation may be done over a number of minutes. A yaw rate offset signal is generated by yaw rate offset compensation logic 347. A summing block 348 sums the raw yaw rate signal and the yaw rate offset signal to obtain a yaw rate compensated signal (YR_Comp).

A low pass filter 349 is used to filter the yaw rate compensated signal for noise. A suitable cutoff frequency for low pass filter 349 is 20 Hz, as gross vehicle roll and yaw movements typically occur well below this frequency.

Referring now to FIG. 17, a roll rate compensated and filtered signal (RR_CompFlt) is further described. The roll rate compensated and filtered signal is generated in a similar manner to that described above with respect to yaw rate. However, the origins of the signal may be the tire sensors as described above. A roll rate offset initialization block 350 receives the velocity at center of gravity signal and a roll rate offset signal. The roll rate offset signal is generated from a previous iteration. Like the yaw rate, when the vehicle is at rest such as during startup, the roll rate offset signal is zero.

A roll rate offset compensation logic block 352 receives the initialized roll rate offset signal. The roll rate offset compensation logic generates a roll rate offset signal which is combined with the roll rate raw signal obtained from the roll rate sensor in a summing block 354. A roll rate compensated signal (RR_Comp) is generated. The roll rate compensated signal is filtered in low pass filter 356 to obtain the roll rate compensated and filtered signal that will be used in later calculations.

Referring now to FIG. 18, a raw lateral acceleration signal (LatAcc Raw) is obtained from lateral acceleration sensor 32. The raw lateral acceleration signal is filtered by a low pass filter to obtain a filtered lateral acceleration signal (Lat Acc Flt) in block 358. The filter, for example, may be a 20 Hz low pass filter.

Figure 19:
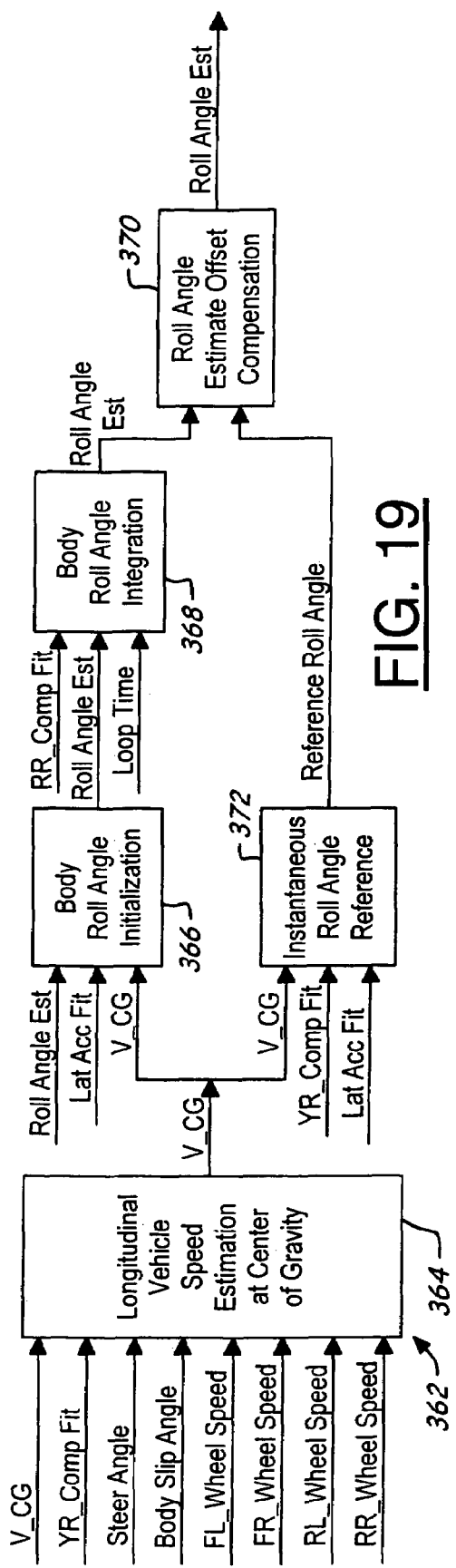
FIG. 19 is a flow chart of chassis roll angle estimation and compensation.

Referring now to FIG. 19, a roll angle estimation signal (RollAngleEst) is determined by chassis roll estimation and compensation procedure 362. Block 364 is used to obtain a longitudinal vehicle speed estimation at the center of gravity of the vehicle. Various signals are used to determine the longitudinal vehicle speed at the center of gravity including the velocity of the vehicle at center of gravity determined in a previous loop, the compensated and filtered yaw rate signal determined in FIG. 16, the steering angle, the body slip angle, the front left wheel speed, the front right wheel speed, the rear left wheel speed, and the rear right wheel speed.

The new velocity of the center of gravity of the vehicle is an input to body roll angle initialization block 366. Other inputs to body roll angle initialization block 366 include roll angle estimate from the previous loop and a filtered lateral acceleration signal derived in FIG. 18. An updated roll angle estimate is obtained from body roll angle initialization block 366. The updated roll angle estimate, the compensation and filtered roll rate determination from FIG. 19, and the time of the loop is used in body roll angle integration block 368. The updated roll angle estimate is equal to the loop time multiplied by the compensated and filtered roll rate which is added to the previous roll angle estimate obtained in block 366. The updated roll angle estimate is an input to roll angle estimate offset compensation block 370.

The velocity at the center of gravity of the vehicle is also an input to instantaneous roll angle reference block 372. Other inputs to instantaneous roll angle reference block 372 include the compensated and filtered yaw rate from FIG. 16 and the filtered lateral acceleration signal from FIG. 18. The following formula is used to determine a reference roll angle:

ReferenceRollAngle=ARCSin[1/g(VCG*YRCompFlt-LatAccFlt)]

Where g is the gravitational constant 9.81 m/s².

The reference roll angle from block 372 is also an input to roll angle estimate offset compensation. The updated roll angle estimation is given by the formula:

$RollAngleEst = RollAngleEst(\text{from Block 368}) +$
$(\text{Reference Roll Angle} - RollAngleEst(Block\ 368))\dfrac{\text{loop time}}{Tau}$ Where Tau is a time constant and may be a function of steering velocity, LatAcc and V-CG. A suitable time constant may, for example, be 30 seconds.

Figure 20:
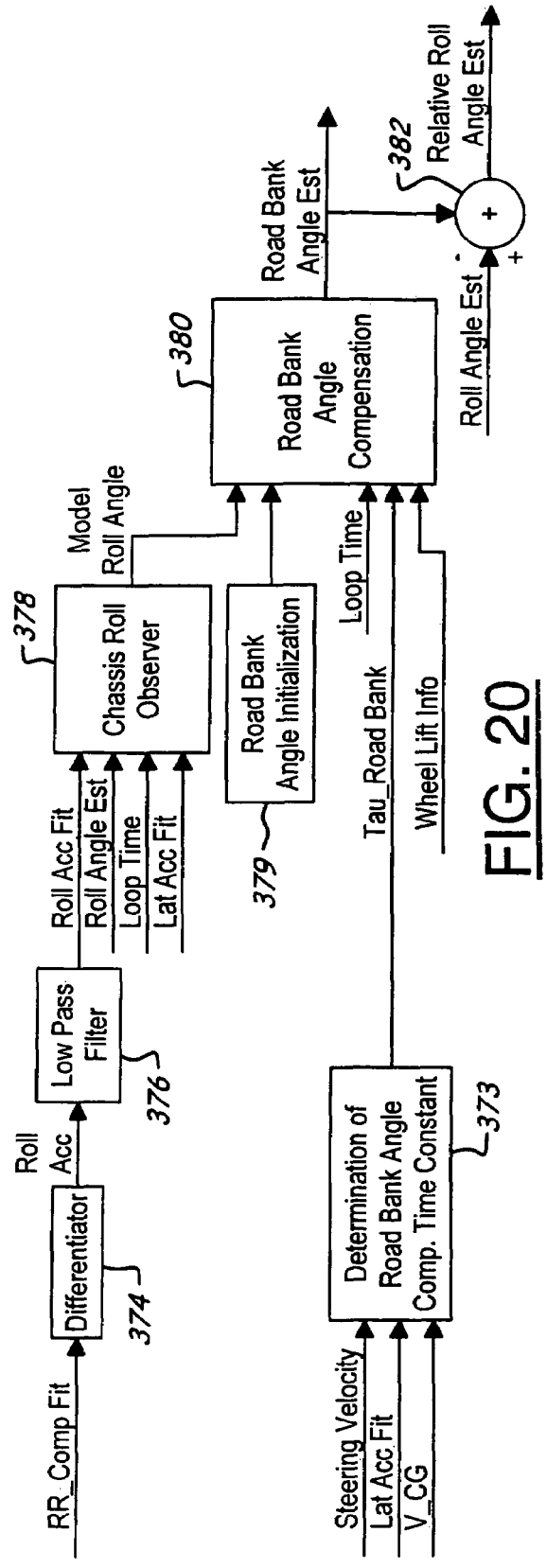
FIG. 20 is a flow chart of a relative roll calculation.

Referring now to FIG. 20, a relative roll angle estimation (RelativeRollAngleEst) and a road bank angle estimate signal is determined. The first step of the relative roll angle calculation involves the determination of road bank angle compensation time constant (Tau) block 373. The velocity at the center of gravity, the steering velocity and the filtered lateral acceleration signal from FIG. 18 are used as inputs. A compensated and filtered roll rate (RR_CompFlt) is used as an input to a differentiator 374 to determine a roll acceleration (Roll Acc). Differentiator 374 takes the difference between the compensated and filtered roll rate signal from the previous loop and the compensated and filtered roll rate from the current loop divided by the loop time to attain the roll acceleration. The roll acceleration signal is coupled to a low pass filter 376. The filtered roll acceleration signal (Roll Acc Flt), roll angle estimate, the filtered lateral acceleration signal and the loop time are coupled to chassis relative roll observer block 378. The chassis roll observer 378 determines the model roll angle estimation (Model Roll Angle Est). The model roll angle is a stable estimation of the roll dynamics of the vehicle which allows the estimates to converge to a stable condition over time.

From the model roll angle estimation from block 378, the initial relative roll angle estimation from block 372, a road bank angle initialization from a block 379 loop time and a roll angle estimate, road bank angle compensation block 380 determines a new road bank angle estimate. The formula for road bank angle is:

$$RoadBankAngleEst = \dfrac{LoopTime}{\text{TauRoad\_Bank}} * \left(RollAngleEst - \left(\begin{array}{c}ModelRollAngle+\\RoadBankAngleEst\end{array}\right)\right)$$

The roll angle estimate may be summed with the road bank angle estimate from block 380 in summer 382 to obtain a relative roll angle estimate. The road bank angle estimate may be used by other dynamic control systems.

Figure 21:
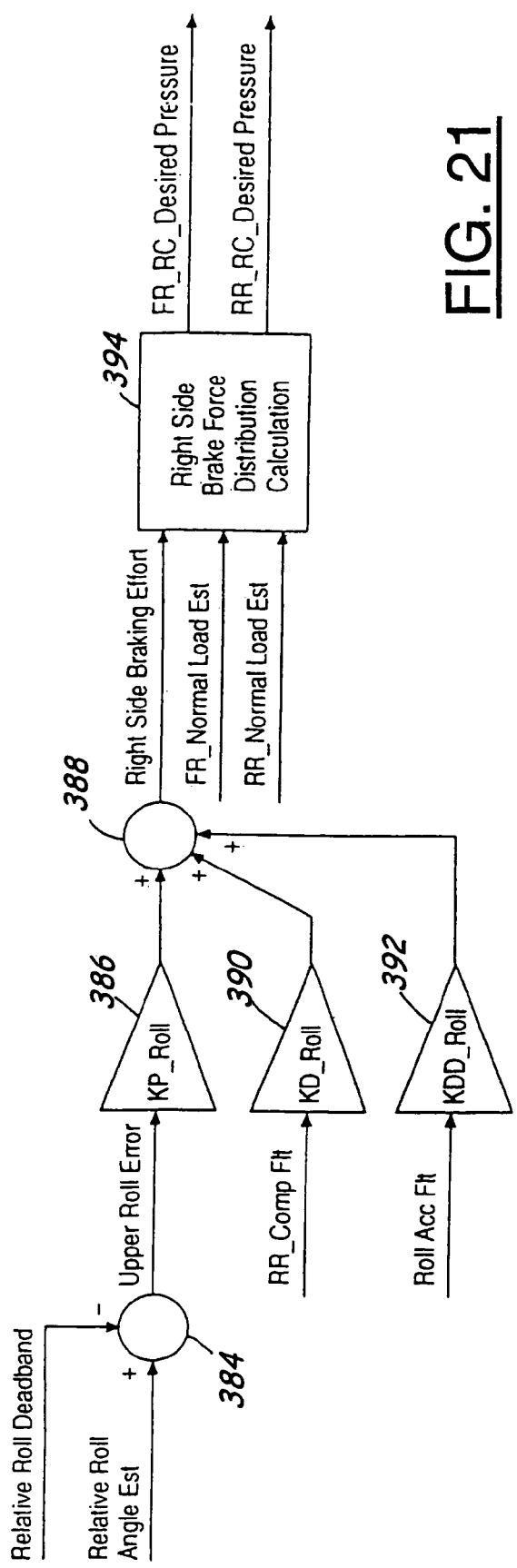
FIG. 21 is a flow chart of system feedback for the right side of the vehicle resulting in brake distribution force.

Referring now to FIG. 21, the relative roll angle estimate from FIG. 20 and a relative roll deadband are summed in summer 384 to obtain an upper roll error. The upper roll error is amplified in KP_Roll Amplifier 386 and is coupled to summer 388. The roll rate compensated and filtered signal from FIG. 19 is coupled to KD_Roll Amplifier 390. The amplified roll rate signal is coupled to summer 388. The filtered roll acceleration signal from FIG. 20 is coupled to KDD_Roll Amplifier 392. The amplified signal is also coupled to summer 388. The proportioned sum of the amplified signals is the right side braking force effort. From this, the right side brake force distribution calculation block 394 is used to determine the distribution of brake pressure between the front and rear wheels. The front right normal load estimate and the rear right normal load estimate are inputs to block 394. The front right roll control desired pressure and the right rear roll control desire pressure are outputs of block 394. The block 394 proportions the pressure between the front right and rear right signals to prevent roll. The front right, for example, is proportional according to the following formula:

$$FR\ \text{desired pressure} = \text{Right side braking effort}\left(\dfrac{FRNormal}{FR+RR}\right)$$

The output of block 394 is used by the brake controller 60 to apply brake pressure to the front right and rear right wheels. The brake controller factors in inputs such as the brake pressure currently applied to the vehicle through the application of pressure by the driver on the brake pedal. Other inputs include inputs from other dynamic control systems such as a yaw control system.

Figure 22:
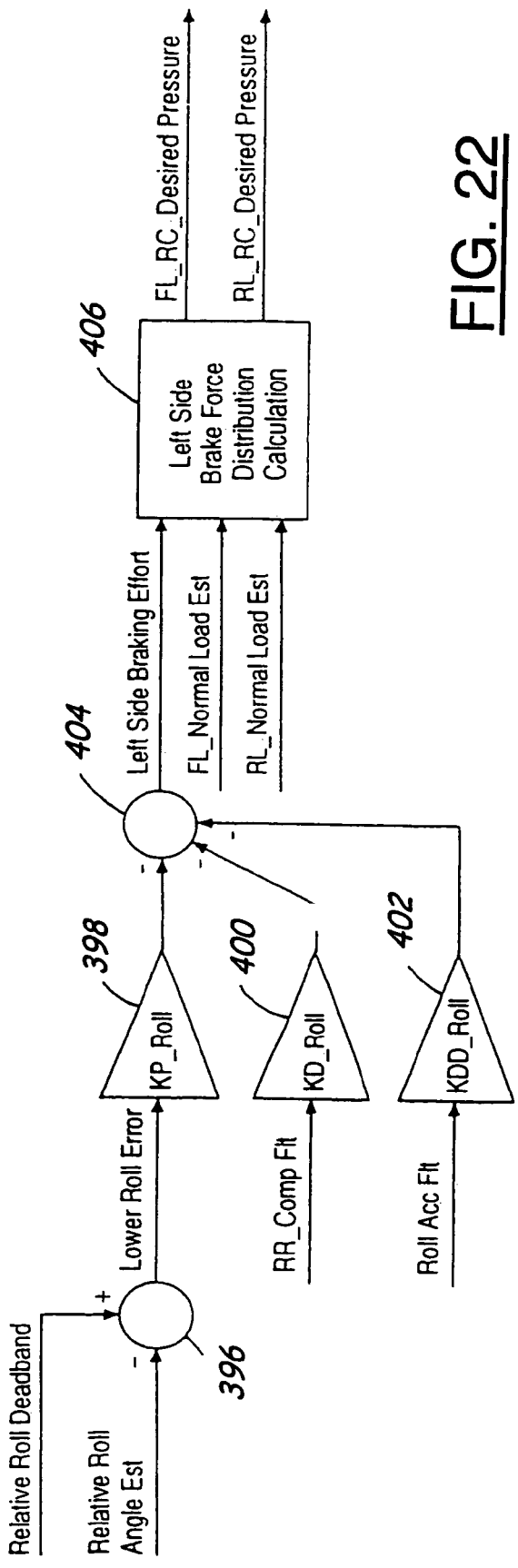
FIG. 22 is a flow chart of system feedback for the left side of the vehicle resulting in brake distribution.

Referring now to FIG. 22, a similar calculation to that of FIG. 21 is performed for the left side of the vehicle. The relative roll angle estimate and relative roll deadband are inputs to summing block 396. However, the signs are changed to reflect that the left side of the vehicle is a negative side of the vehicle. Therefore, relative roll angle estimate and relative roll deadband are purely summed together in summing block 396 to obtain the lower roll error. The lower roll error is passed through KP_Roll amplifier 398. The compensated and filtered roll rate is passed through KD_Roll amplifier 400 and the filtered roll acceleration signal is passed through KDD_Roll amplifier 402. The inverse of the signals from amplifiers 398, 400 and 402 are input and summed in summer 404 to obtain the left side braking effort.

A left side brake force distribution calculation block 406 receives the left side braking effort from summer 404. The front left normal load estimate and the rear left normal load estimate. In a similar manner to that above, the front left and rear left roll control brake pressures are determined. By properly applying the brakes to the vehicle, the tire moment is reduced and the net moment of the vehicle is counter to a roll direction to reduce the roll angle and maintain the vehicle in a horizontal plane.

Figure 23:
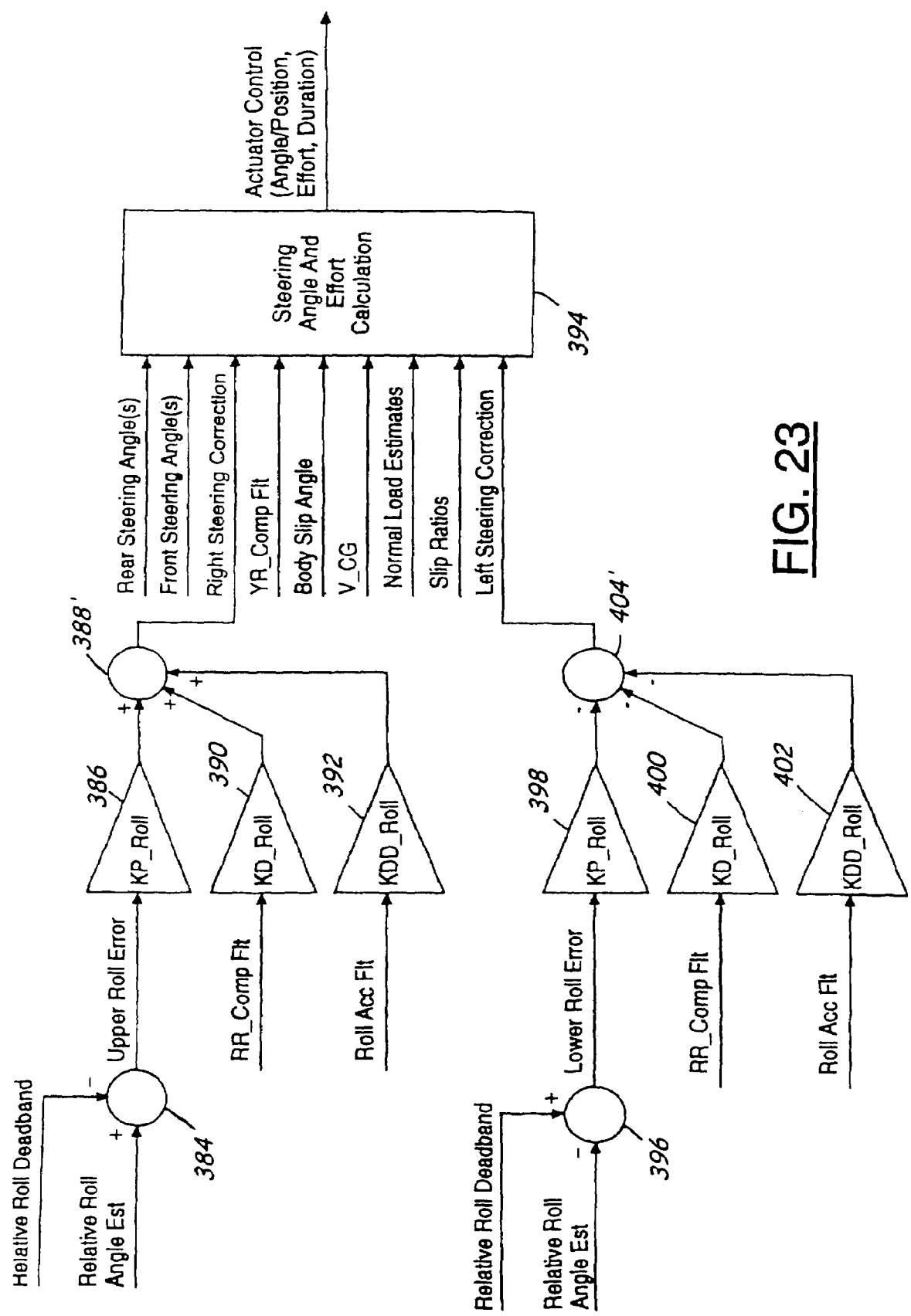
FIG. 23 is a flow chart of another embodiment similar to that of FIGS. 21 and 22 resulting in change in steering position.

Referring now to FIG. 23, a change in steering angle may be effectuated rather than or in combination with a change in brake force distribution. In either case, however, the tire force vector is changed. In FIG. 23, the same reference numerals as those in FIGS. 21 and 22 are used but are primed. Everything prior to blocks 388' and 404' is identical. Blocks 388' and 404' determine right side steering effort and left side steering effort, respectively.

The proportioned sum of the amplified signals is the right side steering tire correction. The rear (and front) steering actuator control signals are calculated from the tire corrections, the front and rear steer angles or the actuator positions, the vehicle side slip angle, the vehicle yaw rate and vehicle speed. Increased accuracy and robustness can be achieved by including tire normal load estimates and/or tire slip ratios. In a steering angle and effort correction block 394, the tire slip angles are calculated and used to determine the corrections to the rear (and front) steer angles that will reduce the tire lateral forces and reduce the vehicle roll angle. Block 394 also calculates the actuator control signals necessary to achieve the desired tire steering corrections.

The measured steering actuator positions are inputs to block 394. The change in the actuator direction and effort amounts and duration are outputs of block 394. The block 394 determines the appropriate direction and force amount to apply to the steering actuators to prevent roll.

The output of block 394 is used by a steering controller to apply the desired steering to the front and/or rear wheels depending on the type of steering system. The steering controller factors in inputs such as the current steering position and the dynamics of the vehicle. Other inputs may include inputs from other dynamic control systems such as a yaw control system. In a production ready embodiment, the vehicle design characteristics will be factored into the desired control based on the sensor outputs.

The bottom portion of FIG. 23 is similar to the top, however, the signs are changed to reflect that the left side of the vehicle is a negative side of the vehicle. Therefore, relative roll angle estimate and relative roll deadband are purely summed together 396 in summing block 396 to obtain the lower roll error. The lower roll error is passed through KP_Roll amplifier 398. The compensated and filtered roll rate is passed through KD_Roll amplifier 100 and the filtered roll acceleration signal is passed through KDD_Roll amplifier 402. The inverse of the signals from amplifiers 398, 400 and 402 are input and summed in summer 104 to obtain the desired left actuator control.

By properly applying a desired steering control to the vehicle, the tire moment is reduced and the net moment of the vehicle is counter to a roll direction to reduce the roll angle and maintain the vehicle in a horizontal plane.

If both steering and brake distribution are used controller 26 will be used to apportion the amount of correction provided by steering and brake distribution. The amount of apportionment will depend on the roll rate and other variables for the particular vehicle. The amount of apportionment will thus be determined for each vehicle. For example, higher profile vehicles will be apportioned differently from a low profile vehicle.

In operation, various types of steering control may be performed depending on the vehicle characteristics and the steering system. For example, as described above a rack system may be controlled to provide a desired change in the rear steering angle temporarily to prevent rollover while leaving the front wheels unchanged. Of course, the direction of the front wheels could also be change when the rear direction is changed.

In a system having independently actuable front wheels, the relative steering angle between the front wheels may be changed in response to detected roll without changing the position or controlling the position of the rear wheel. This may be done by independent control of the front wheels or simultaneous control of the front wheels.

In a system having independently actuable rear wheels, the relative steering angle between the front wheels may be changed in response to detected roll by steering control 38 without changing the position or controlling the position of the front wheels. This may be done by independent control of the rear wheels or simultaneous control of the rear wheels.

As described above the longitudinal acceleration sensor and a pitch rate sensor may be incorporated into the above tire force vector determination. These sensors may be used as a verification as well as an integral part of the calculations. For example, the pitch rate or the longitudinal acceleration or both can be used to construct a vehicle pitch angle estimate. This estimate along with its derivative can be used to improve the calculation of the vehicle roll angle. An example of how the rate of change of the vehicle roll angle using theses variables may be constructed is:

$$GlobalRR \approx RRComp\_Flt + PitchRateCompFlt(-YawRate +$$
$$Sin(GlobalRollAngleEst) *$$
$$Tan(VehiclePitchAngleEst)) +$$
$$(YawRateCompFlt * Cos(GlobalRR) *$$
$$Tan(PitchAngleEst))$$

Where PitchRateCompFlt is a compensated and filtered pitch rate signal, GlobalRollAngleEst is an estimated global roll angle, VehiclePitchAngleEst is an estimated vehicle pitch angle estimate, and GlobalRR is a global roll rate signal. Of course, those skilled in the art may vary the above based upon various other factors depending on the particular system needs.

While particular embodiments of the invention have been shown and described, numerous variations and alternate embodiments will occur to those skilled in the art. Accordingly, it is intended that the invention be limited only in terms of the appended claims.

What is claimed is:

1. A control system for a vehicle comprising:
   a tire sensor generating a roll condition signal indicative of a roll condition;
   a rollover control system; and,
   a controller coupled to the tire sensor and the rollover control system, said controller generating a control signal in response to the roll condition signal, said control signal controlling the rollover control system to prevent the vehicle from rolling over.

2. A control system as recited in claim 1 wherein the rollover control system comprises a brake system.

3. A control system as recited in claim 1 wherein the rollover control system comprises a brake system and a steering system.

4. A control system as recited in claim 1 wherein the rollover control system comprises a steering system.

5. A control system as recited in claim 1 wherein the roll condition signal comprises a roll rate signal.

6. A control system as recited in claim 1 wherein the roll condition signal comprises a roll rate signal about the center of gravity.

7. A control system as recited in claim 1 further comprising a plurality of sensors generating a plurality of vehicle dynamic condition signals, said controller generating the control signal in response to the roll condition signal and the vehicle dynamic condition signal.

8. A control system as recited in claim 1 wherein the roll condition comprises a tripped event.

9. A control system as recited in claim 1 wherein the roll condition comprises high lateral forces at contact patches of the tire.

10. A control system as recited in claim 1 wherein the roll condition comprises a one-wheel lifting event.

11. A control system as recited in claim 1 wherein the roll condition comprises a two-wheel lifting event.

12. A control system as recited in claim 1 wherein the roll condition comprises roll angle.

13. A control system as recited in claim 1 wherein the roll condition comprises a bank angle.

14. A control system as recited in claim 1 wherein the roll condition comprises a pitch angle.

15. A control system as recited in claim 1 wherein the roll condition comprises a normal force.

16. A control system as recited in claim 1 wherein the tire sensor comprises sidewall sensors.

17. A control system as recited in claim 1 wherein the tire sensor comprises tread sensors.

18. A control system as recited in claim 1 wherein the tire sensor comprises a plurality of tire sensors generating roll condition signals indicative of the roll condition, said controller generating the control signal in response to the roll condition signals.

19. A method of controlling the vehicle comprising:
    generating lateral tire force signals at each of the tires using respective tire sensors;
    determining a roll event in response to the lateral acceleration force; and
    reducing lateral force on an outside tire relative to a turn in response to the roll event.

20. A method as recited in claim 19 wherein reducing lateral force on an outside tire comprises braking.

21. A method as recited in claim 19 wherein reducing lateral force on an outside tire comprises steering.

22. A method as recited in claim 19 wherein the roll event comprises a roll rate above a roll rate threshold.

23. A method as recited in claim 19 wherein the roll vent comprises a roll angle above a roll angle threshold.

24. A method as recited in claim 19 wherein the tire sensor comprises sidewall sensors.

25. A method as recited in claim 19 wherein the tire sensor comprises tread sensors.

* * * * *